(12) United States Patent  
Fujikane et al.

(10) Patent No.: US 8,632,439 B2  
(45) Date of Patent: Jan. 21, 2014

(54) CONTROL DEVICE FOR VEHICULAR LOCKUP CLUTCH

(75) Inventors: Tsuyoshi Fujikane, Toyota (JP); Yousuke Kobayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 12/976,315

(22) Filed: Dec. 22, 2010

(65) Prior Publication Data

US 2011/0233023 A1 Sep. 29, 2011

(30) Foreign Application Priority Data

Mar. 26, 2010 (JP) ................................ 2010-072743

(51) Int. Cl.
- B60W 10/02 (2006.01)
- B60W 10/04 (2006.01)
- F16D 25/00 (2006.01)

(52) U.S. Cl.
USPC ............ 477/171; 477/143; 477/168; 477/180

(58) Field of Classification Search
USPC .......................................... 477/171, 74, 168
See application file for complete search history.

(56) References Cited

U.S. PATENT DOCUMENTS

| | | | |
|---|---|---|---|
| 6,253,140 B1 * | 6/2001 | Jain et al. | 701/67 |
| 7,041,030 B2 * | 5/2006 | Kuroda et al. | 477/21 |
| 2006/0237275 A1 * | 10/2006 | Fujita et al. | 192/3.29 |
| 2011/0246036 A1 * | 10/2011 | Tsutsui et al. | 701/67 |

FOREIGN PATENT DOCUMENTS

| | | |
|---|---|---|
| JP | A-2001-165289 | 6/2001 |
| JP | A-2001-280485 | 10/2001 |
| JP | A-2001-295920 | 10/2001 |
| JP | A-2003-247634 | 9/2003 |
| JP | A-2004-316752 | 11/2004 |
| JP | A-2005-003193 | 1/2005 |
| JP | A-2005-016563 | 1/2005 |
| JP | A-2005-042743 | 2/2005 |

OTHER PUBLICATIONS

Japanese Office Action issued in Application No. 2010-072743; Dated Dec. 13, 2011 (With Translation).

* cited by examiner

*Primary Examiner* — David D Le  
*Assistant Examiner* — Mark Manley  
(74) *Attorney, Agent, or Firm* — Oliff & Berridge, PLC

(57) ABSTRACT

A control device for a vehicular lockup clutch, including a lockup clutch that directly connects an input rotation member and an output rotation member of a hydraulic transmission device constituting part of a power transmission path between an engine and drive wheels, a linear solenoid valve that controls an engagement hydraulic pressure for engaging and actuating the lockup clutch, and a controller that is configured to perform a flexible start control for slip-engaging the lockup clutch when a vehicle starts moving, and to perform, before starting the flexible start control, a precharge control for establishing a standby state in which a predetermined preparation pressure is indicated to the linear solenoid valve.

7 Claims, 6 Drawing Sheets

|  | C1 | C2 | B1 | B2 | B3 |
|---|---|---|---|---|---|
| 1st | O |  |  | O |  |
| 2nd | O |  | O |  |  |
| 3rd | O |  |  |  | O |
| 4th | O | O |  |  |  |
| 5th |  | O |  |  | O |
| 6th |  | O | O |  |  |
| R |  |  |  | O | O |
| N |  |  |  |  |  |

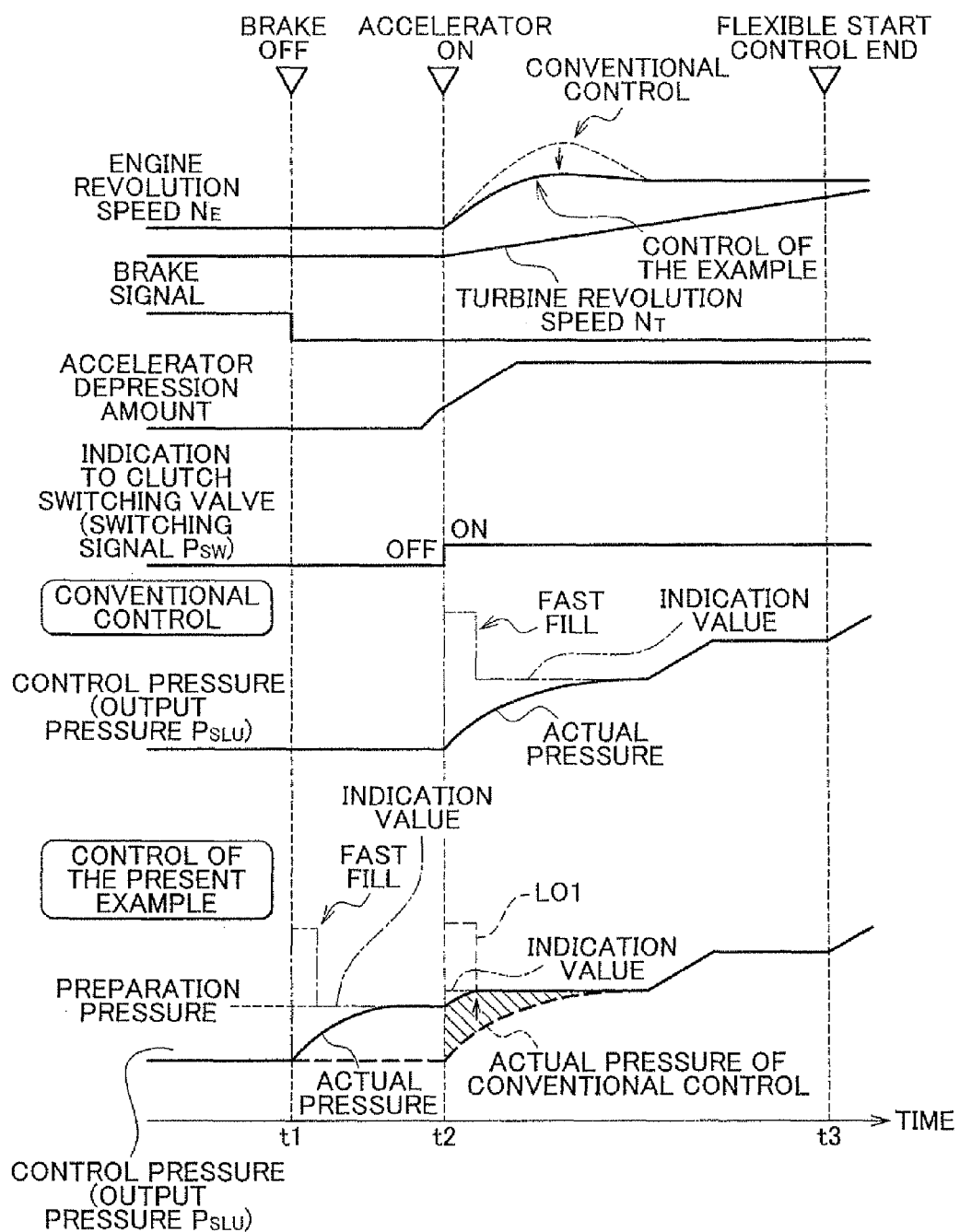

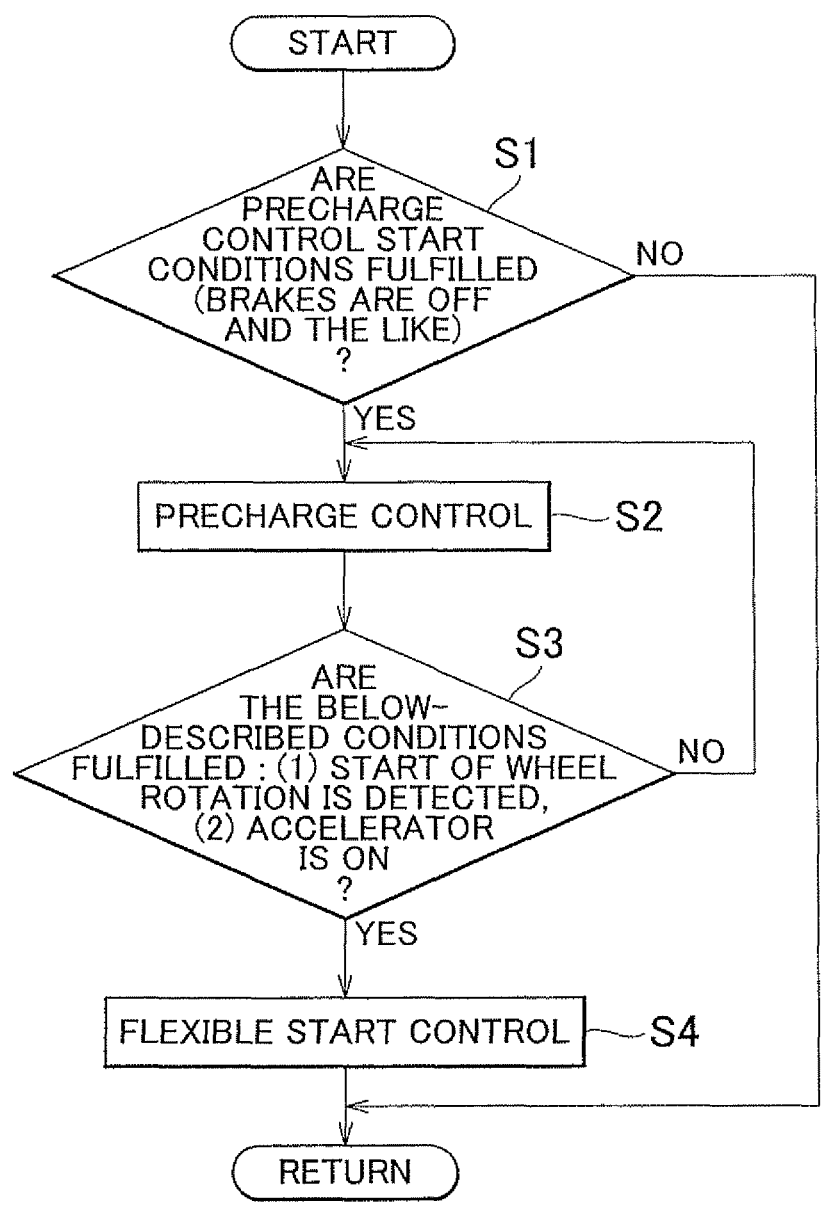

CONTROL DEVICE FOR VEHICULAR LOCKUP CLUTCH

INCORPORATION BY REFERENCE

The disclosure of Japanese Patent Application No. 2010-072743 filed on Mar. 26, 2010 including the specification, drawings and abstract is incorporated herein by reference in its entirety.

BACKGROUND OF THE INVENTION

1. Field of the Invention

The invention relates to a control device for a vehicular lockup clutch, and more particularly to improvement of flexible start control when a vehicle starts moving.

2. Description of the Related Art

In a vehicle provided with a lockup clutch that can directly connect input and output members of a hydraulic transmission device constituting part of a power transmission path between an engine and drive wheels and a linear solenoid valve serving to control an engagement hydraulic pressure for engaging and actuating the lockup clutch, a control device for a vehicular lockup clutch, which conducts flexible start control for slip-engaging the lockup clutch when the vehicle starts moving, is available. For example, such as control device for a vehicular lockup clutch is disclosed in Japanese Patent Application Publication No. 2005-016563 (JP-A-2005-016563). The control device for a vehicular lockup clutch disclosed in JP-A-2005-016563 starts the flexible start control, for example, when an accelerator is stepped on and maintains a control hydraulic pressure of the linear solenoid valve in advance at a predetermined initial engagement pressure in predetermined initial engagement section before the slip engagement of the lockup clutch is started in the flexible start control. With the control device described in JP-A-2005-016563, by performing the flexible start control in the above-described manner, it is possible to reduce a control error when slip engagement of the lockup clutch is started and perform stable slip engagement of the lockup clutch when the vehicle starts moving.

In the control device described in JP-A-2005-016563, a control hydraulic pressure of the linear solenoid valve is raised to the initial engagement pressure at the initial stage of the flexible start control, whereby the responsiveness of hydraulic control is ensured in the subsequent slip engagement of the lockup clutch. However, it cannot be said that sufficient responsiveness has been ensured. For example, when a case is considered in which the working oil used for the hydraulic control of the lockup clutch has an ultralow temperature or an ultrahigh temperature, the responsiveness will apparently be insufficient, although such data are not publicly available. A problem encountered when the responsiveness of the hydraulic control is low is that drivability and fuel consumption are degraded by an overshoot of engine revolution speed.

Further, in a fast-fill mode in which a hydraulic pressure command value for the linear solenoid valve is temporarily set high when the flexible start control is started, it is also possible to ensure the responsiveness of the engagement hydraulic pressure by setting the hydraulic pressure command value in the fast-fill mode even higher, but where the hydraulic pressure command value is set high in the fast-fill mode, a hydraulic pressure overshoot easily occurs and it is highly probable that controllability of hydraulic pressure will degrade. Such problem is not publicly disclosed.

SUMMARY OF THE INVENTION

The invention has been created with the foregoing in view and the invention provides a control device for a vehicular lockup clutch that can ensure sufficient responsiveness of the lockup clutch in the flexible start control.

A first aspect of the invention relates to the following control device for a vehicular lockup clutch. This control device includes:

a lockup clutch that directly connects an input rotation member and an output rotation member of a hydraulic transmission device constituting part of a power transmission path between an engine and drive wheels;

a linear solenoid valve that controls an engagement hydraulic pressure for engaging and actuating the lockup clutch; and a controller that is configured to perform a flexible start control for slip-engaging the lockup clutch when a vehicle starts moving, and to perform, before starting the flexible start control, a precharge control for establishing a standby state in which a predetermined preparation pressure is indicated to the linear solenoid valve.

With the above-described control device for a vehicular lockup clutch, immediately before the flexible start control is started, the output hydraulic pressure outputted from the linear solenoid valve rises to the preparation pressure or a hydraulic pressure close thereto and therefore a sufficient increase in response of the lockup clutch in the flexible start control over that in the case without the precharge control can be ensured. Therefore, for example, the unnecessarily rapid increase in the revolution speed of the engine caused by a delay of response in hydraulic pressure control of the linear solenoid valve in the flexible start control can be adequately inhibited and fuel consumption can be improved. Further, since the unnecessarily rapid increase in the revolution speed of the engine is inhibited when the vehicle starts moving, the drivability is improved.

It is also preferred that a switching valve be provided that can block the supply of the engagement hydraulic pressure to the lockup clutch, regardless of the operation state of the linear solenoid valve, and the supply of the engagement hydraulic pressure could be blocked by the switching valve while the precharge control is being performed. As a result, the disengaged state of the lockup clutch can be reliably maintained while the precharge control is being performed and therefore the lockup clutch can be prevented from being actuated to the engagement side before the vehicle starts moving and the unnecessary decrease in the engine revolution speed caused thereby can be avoided.

Further, it is preferred that the switching valve be switched to the state in which the engagement hydraulic pressure can be supplied when the flexible start control is started. As a result, the engagement hydraulic pressure that has been set high in advance by the precharge control can be supplied to the lockup clutch immediately after the flexible start control has been started. Therefore, before the flexible start control is started, the disengaged state of the lockup clutch can be reliably maintained, and where the flexible start control is started, the lockup clutch can be immediately actuated with good responsiveness to the engagement side.

Further, it is preferred that the precharge control be started when braking of the wheels is canceled. In this case, it is also preferred that the precharge control be started when braking of the wheels is canceled, the vehicle has been stopped, and the shift lever is in a drive range. It is also preferred that the flexible start control be started when the operation amount of the accelerator pedal is equal to or greater than a predetermined value and the vehicle speed is equal to or higher than a predetermined value. As a result, since it can be predicted that where braking of the wheels is canceled when the vehicle starts moving, for example, the accelerator pedal will be stepped on and the flexible start control will be started immediately thereafter, the precharge control can be started in a suitable period before the flexible start control is started and responsiveness of the lockup clutch in the flexible start control can be ensured.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein:

FIG. 6 is a time chart for explaining an example of precharge control performed by the precharge control device shown in FIG. 5, and FIG. 7 is a flowchart illustrating main features of control operations of the present embodiment performed by the electronic control unit shown in FIG. 3, that is, control operations performed by flexible start control after the precharge control has been performed.

DETAILED DESCRIPTION OF EMBODIMENTS

The embodiments of the invention will be described below in greater detail with reference to the appended drawings.

Figures 1, 2:
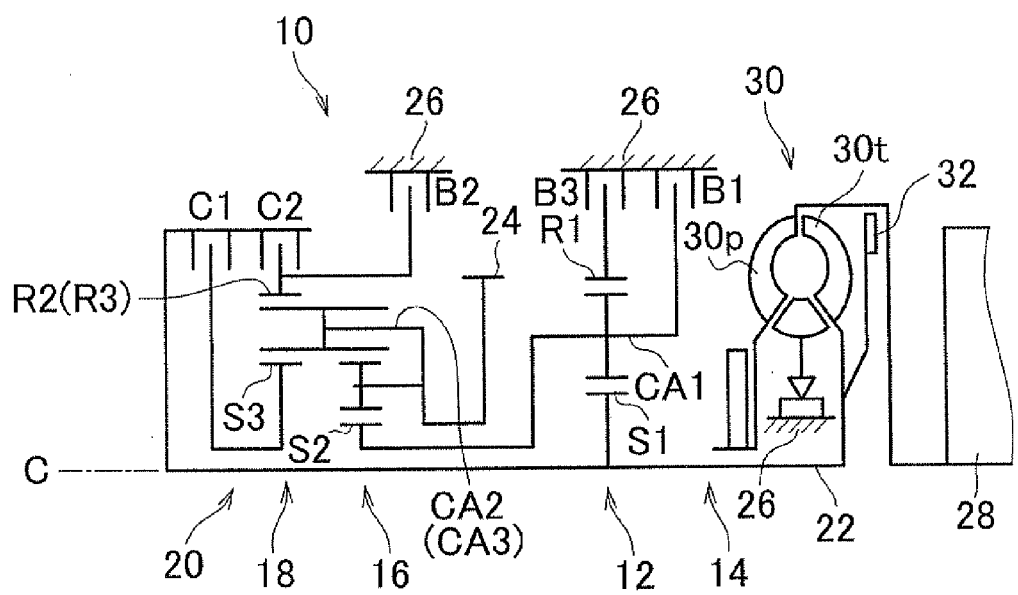
FIG. 1 is a drawing outlining the configuration of a power transmission device of a vehicle that can advantageously use the invention.
FIG. 2 is an engagement operation table illustrating the engagement stage of frictional engagement elements, that is, frictional engagement devices, when a plurality of transmission stages are selectively established in the automatic transmission shown in FIG. 1.

FIG. 1 is a drawing outlining the configuration of a power transmission device of a vehicle 8 that can advantageously use the invention. An automatic transmission 10 shown in FIG. 1 can be advantageously mounted in the left-right direction (transversely) on a front engine-front drive (FF) vehicle. A first transmission unit 14 constituted mainly by a first planetary gear device 12 of a single pinion type and a second transmission unit 20 of a Ravigneaux type constituted mainly by a second planetary gear device 16 of a double pinion type and a third planetary gear device 18 of a single pinion type are provided on a common center axis denoted by C in FIG. 1 inside a transmission case 26 as a non-rotating member attached to a vehicle body. The rotation of an input shaft 22 is transmitted via the first transmission unit 14 and the second transmission unit 20 and outputted from a transmission output member 24. The input shaft 22 corresponds to an input member of the automatic transmission 10. In the present embodiment, the input shaft corresponds to a turbine shaft of a torque converter 30 that is rotationally driven by an engine 28 that is a drive power source for running the vehicle. The transmission output member 24 corresponds to an output member of the automatic transmission 10 and functions as an output gear, that is, a differential drive gear, meshing with a differential driven gear (large-diameter gear) 36 for transmitting the power to a differential gear mechanism 34 shown in FIG. 3. As shown in FIG. 1, a torque converter 30 is provided in a power transmission path between the automatic transmission 10 and the engine 28 serving as a drive power source. The output of the engine 28 is transmitted to the automatic transmission 10 via the torque converter 30 and then transmitted to a pair (left and right) of drive wheels 40 via the automatic transmission 10, differential gear device 34, and a pair (left and right) wheel shafts 38. The vehicle 8 (see FIG. 3) of the present embodiment is provided with the above-described automatic transmission 10, engine 28, torque converter 30, differential gear device 34, wheel shafts 38, drive wheels 40, and wheel brake devices 42 (see FIG. 3). Further, the automatic transmission 10 and the torque converter 30 are configured substantially symmetrically with respect to the center axis C thereof. In the outline drawing in FIG. 1, the section located below the center line C is omitted. The drive wheels 40 and driven wheels (not shown in the figure) are the wheels provided at any vehicle 8, and in the explanation of the present embodiment, they will be referred to as wheels, without distinguishing the drive wheels 40 and the driven wheels.

Figure 4:
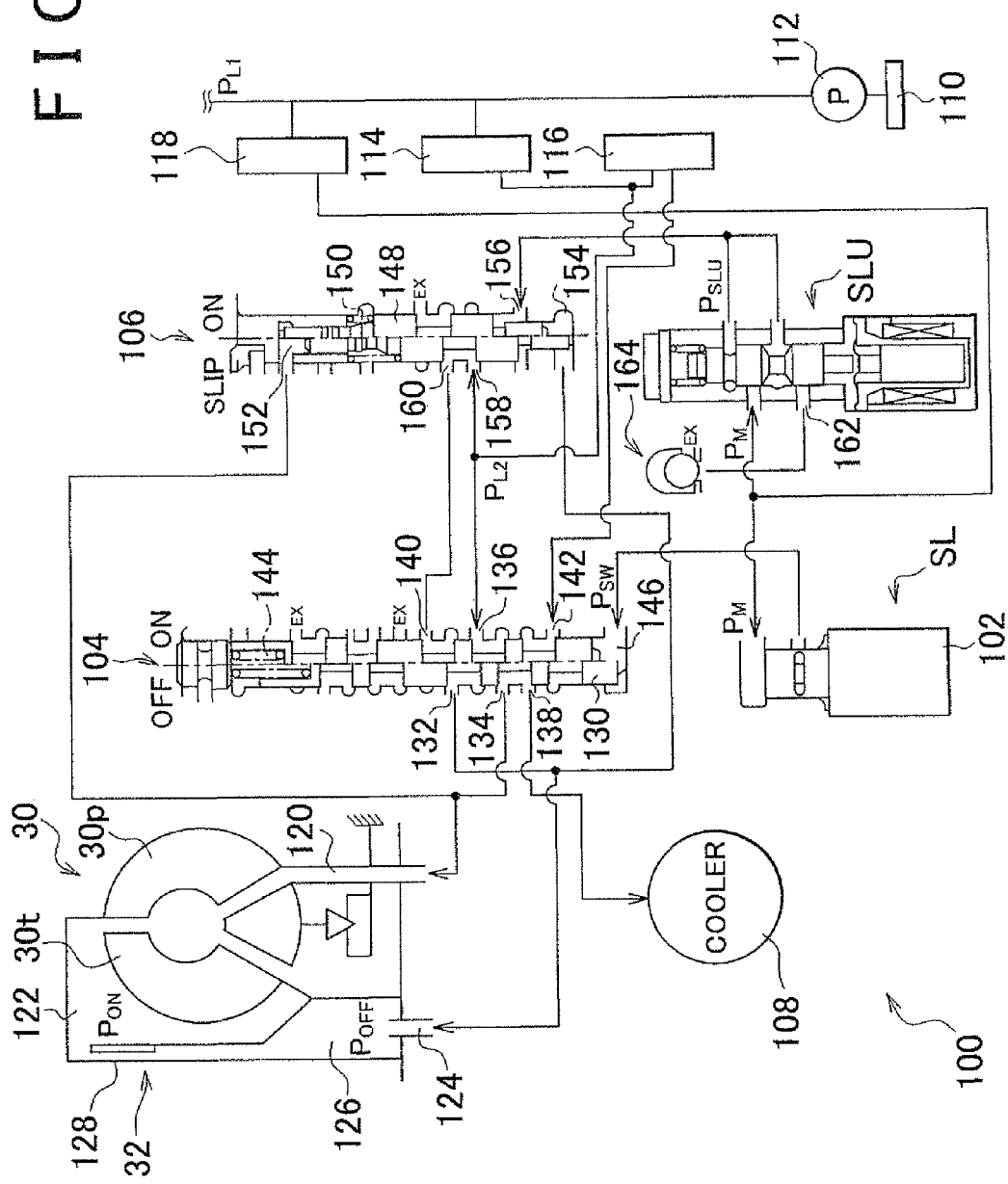
FIG. 4 is a hydraulic circuit diagram illustrating an extracted portion of the hydraulic control circuit provided in the power transmission device shown in FIG. 1, this portion relating to the control of the engagement stage of the lockup clutch.

The engine 28 is for example an internal combustion engine, such as a gasoline engine or a diesel engine, in which drive power is generated by combustion of fuel injected into cylinders. The torque converter 30 is provided with a pump vane wheel 30p connected to a crank shaft of the engine 28 and a turbine vane wheel 30t connected to the automatic transmission 10 via the turbine shaft and is a hydraulic transmission device that performs power transmission between the pump vane wheel 30p and the turbine vane wheel 30t via a fluid. Thus, in the torque converter 30 of the present embodiment the pump vane wheel 30p corresponds to an input rotation member that is a rotation member on the input side, and the turbine vane wheel 30t corresponds to an output rotation member that is a rotation member on the output side. The torque converter 30 is provided between the pump vane wheel 30p and the turbine vane wheel 30t with a lockup clutch (direct connection clutch) 32 that can be directly connected so as to rotate integrally with the pump vane wheel 30p and the turbine vane wheel 30t. The lockup clutch 32 is configured so that the engagement state thereof is controlled between disengagement, slip engagement (semi-engagement), and complete engagement by a hydraulic control circuit 100 such as shown in FIG. 4 described hereinbelow. When the lockup clutch is completely engaged, the pump vane wheel 30p and the turbine vane wheel 30t rotate integrally.

The wheel brake device 42 is a well-recognized drum brake or disk brake and provided for each wheel. The wheels are braked when a driver steps on a foot brake pedal 54 (see FIG. 3). Thus, the wheels are braked by a brake hydraulic pressure generated by stepping on the foot brake pedal 54.

The automatic transmission 10 is for example a multistage automatic transmission in which any of a plurality of preset transmission stages (speed ratio) is selectively established. The transmission is configured by providing a plurality of hydraulic frictional engagement devices as engagement elements for changing the speed. Thus, as shown in FIG. 1, clutches C1, C2 and brakes B1 to B3 (when these components are not specifically distinguished, they are simply referred to as clutches C and brakes B) are provided. These clutches C and brakes B are hydraulic frictional engagement devices that are engaged by a hydraulic actuator, such as multiplate clutches or brakes. The engaged and disengaged states of the clutches and brakes are switched and excess hydraulic pressure during engagement and disengagement thereof is controlled by excitation, de-excitation, and current control of a linear solenoid valve serving as an electromagnetic valve device located inside the below-described hydraulic control circuit 100. Further, in the automatic transmission 10, six forward transmission stages (forward gear stages, gear stages for traveling forward), namely, first transmission stage (first speed gear stage) "1st" to sixth transmission stage (sixth speed gear stage) "6th" and one rearward transmission stage (rearward gear stage, gear stage for travelling rearward) "R" are established according to the combination of connection stages of rotation elements (sun gears S1 to S3, carriers CA1 to CA3, and ring gears R1 to R3) of the first transmission unit 14 and the second transmission unit 20 by selectively engaging and disengaging the clutches C and brakes B.

FIG. 2 is an engagement operation table illustrating the operation state of frictional engagement elements, that is, the frictional engagement device, when a plurality of transmission stages are selectively established in the automatic transmission 10. The transmission operation table represents the relationship between the operation stages of the transmission stages, clutches C1, C2, and brakes B1 to B3. Symbol "O" in the table represents the engagement. As shown in FIG. 2, in the automatic transmission 10, the first speed gear stage "1st" is established by engaging the clutch C1 and the brake B2, the second speed gear stage "2nd" is established by engaging the clutch C1 and the brake B1, the third speed gear stage "3rd" is established by engaging the clutch C1 and the brake B3, the fourth speed gear stage "4th" is established by engaging the clutch C1 and the clutch C2, the fifth speed gear stage "5th" is established by engaging the clutch C2 and the brake B3, and the sixth speed gear stage "6th" is established by engaging the clutch C2 and the brake B1. The rearward gear stage "R" is established by engaging the brake B2 and the brake B3, and a neutral state "N" is established by disengaging any of the clutches C1, C2 and brakes B1 to B3. The speed ratio of each transmission stage is appropriately determined by gear ratios (=(number of teeth in a sun gear)/(the number of teeth in a ring gear)) $\rho 1, \rho 2, \rho 3$ of the first planetary gear device 12, the second planetary gear device 16, and the third planetary gear device 18.

Figure 3:
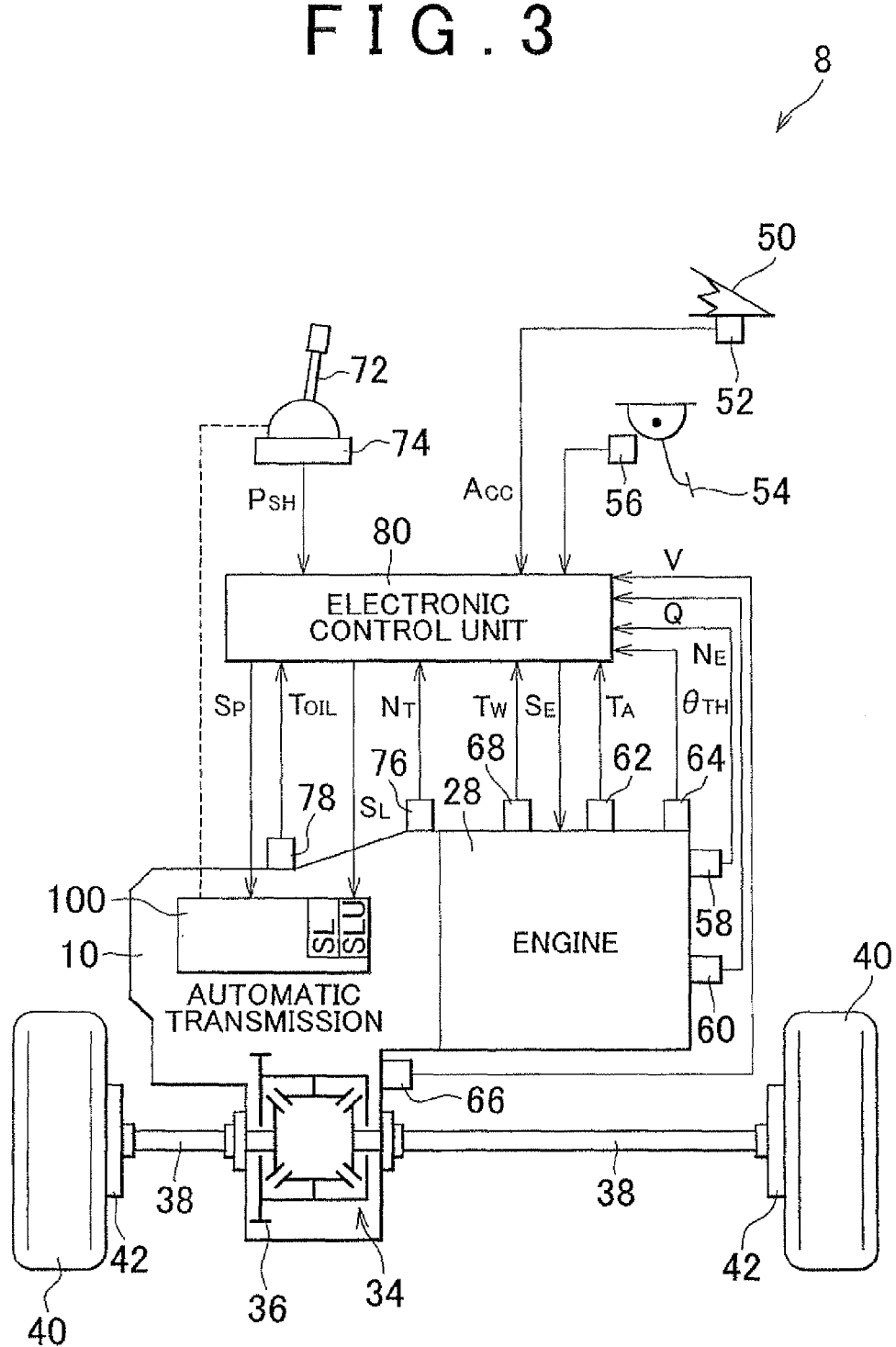
FIG. 3 is a block diagram illustrating main components of an electric control system provided in the vehicle for controlling the automatic transmission shown in FIG. 1.

FIG. 3 is a block diagram illustrating main components of the electric control system provided in the vehicle 8 to control the automatic transmission 10 and the like. The electronic control unit 80 shown in FIG. 3 is configured for example by including the so-called microcomputer provided with a central processing unit (CPU), a random access memory (RAM), a read-only memory (ROM), and an input interface, and so that control operations of various kinds, such as output control of the engine 28 and transmission control of the automatic transmission 10, are performed by performing signal processing according to a program that has been stored in advance in the ROM, while using a temporary storage function of the RAM with the CPU. The electronic control unit 80 includes a function of a control unit that performs engagement and disengagement of the lockup clutch 32. Further, if necessary, the electronic control unit 80 is configured as individual control units for each type of control, that is, a control unit for output control of the engine 28 and a control unit for transmission control of the automatic transmission 10.

As shown in FIG. 3, signals obtained from various sensors and switches provided at the vehicle and indicating the detection values thereof are supplied to the electronic control unit 80. Thus, a signal representing an operation amount (accelerator depression amount) Acc of the accelerator pedal 50 that is used as the so-called accelerator depression amount is supplied to the electronic control unit 80 from an accelerator operation amount sensor 52, a signal indicating whether a foot brake pedal 54 that is a usual brake is supplied from a brake switch 56, a signal indicating a revolution speed $N_E$ of the engine 28 is supplied to an engine revolution speed sensor 58, a signal indicating an intake air quantity Q of the engine 28 is supplied from an engine intake air amount sensor 60, a signal indicating a temperature $T_A$ of the intake air of the engine 28 is supplied from an engine intake air temperature sensor 62, a signal indicating an opening degree (throttle valve opening degree) $\theta_{TH}$ of an electronic throttle valve is supplied from a throttle sensor 64, a signal indicating a vehicle speed V corresponding to a revolution speed $N_{OUT}$ of the transmission output member 24 is supplied from a vehicle speed sensor 66, a signal indicating a cooling water temperature $T_W$ of the engine 28 is supplied from a cooling water temperature sensor 68, a signal indicating a lever position (operation position) $P_{SH}$ of a shift lever 72 serving as a shift operation member is supplied from a lever position sensor 74, a signal indicating a revolution speed $N_{IN}$ of the input shaft 22, that is, a turbine revolution speed $N_T$, is supplied from a turbine revolution speed sensor 76, and a signal indicating an AT oil temperature $T_{OIL}$ that is a temperature of working oil inside the hydraulic control circuit 100 is supplied from an AT oil temperature sensor 78.

The electronic control unit 80 is also configured to output signals for controlling the operation of various devices provided at the vehicle. Thus, a signal that drives the throttle actuator for controlling the opening and closing of the electronic throttle valve according to the accelerator depression amount Acc, an injection signal for controlling the amount of fuel injected from a fuel injection device, and an ignition timing signal for controlling the ignition timing of the engine 28 with an ignition device are outputted as engine output control command signals $S_E$ for conducting output control of the engine 28. Further, for example, a signal for driving various electromagnetic valve devices provided in the hydraulic control circuit 100 are outputted as transmission control command signals $S_P$ for conducting transmission control of the automatic transmission 10. Further, signals for driving a solenoid valve SL and a linear solenoid valve SLU (see FIG. 4) provided in the hydraulic control circuit 100 are outputted as lockup clutch engagement control signals $S_L$ for conducting engagement control of the lockup clutch 32 provided in the torque converter 30. The throttle valve opening degree $\theta_{TH}$ has a one-to-one correspondence relationship with the accelerator depression mount Acc, and the electronic control unit 80 increases the throttle valve opening degree $\theta_{TH}$ as the accelerator depression mount Acc increases, on the basis of the preset relationship.

FIG. 4 is a hydraulic circuit diagram illustrating an extracted portion of the hydraulic control circuit 100 provided in the vehicle 8, that is, the control of the engagement state of the lockup clutch 32. As shown in FIG. 4, the hydraulic control circuit 100 is provided with a switching solenoid valve SL that is ON/OFF operated by a switching electromagnetic solenoid 102 and generates a switching signal pressure $P_{SW}$, a clutch switching valve 104 that switches the lockup clutch 32 to a disengagement position (OFF position) corresponding to a disengaged stage or an engagement position (ON position) corresponding to the engaged stage in response to the switching signal pressure $P_{SW}$, a linear solenoid valve SLU for slip control that outputs a signal pressure (output pressure) $P_{SLU}$ corresponding to a drive electric current supplied from the electronic control unit 80, a lockup control valve 106 that switches the operation stage of the lockup clutch 32 within a range from a slip state to a lockup ON state when the lockup clutch 32 is set to the engaged state by the clutch switching valve 104, and a hydraulic cooler 108 for cooling the working oil.

Further, as shown in FIG. 4, the hydraulic control circuit 100 is provided with a mechanical oil pump 112 that is driven, for example, by the engine 28 for sucking in and pumping via a strainer 110 the working oil that has returned to a hydraulic pan (not shown in the figure), and the pressure of the working oil under a pressure raised by the oil pump 112 is adjusted to a first line pressure PL1 by a first pressure adjusting valve 114 of a relief system. A second pressure adjusting valve 116 that is similarly a pressure adjusting valve of a relief system is also provided, and a second line pressure $P_{L2}$ is generated by adjusting the pressure of the working oil flowing out of the first pressure adjusting valve 114 with the second pressure adjusting valve 116. A third pressure adjusting valve 118 is a pressure reducing valve that takes the first line pressure PL1 as a base pressure, and this third pressure adjusting valve 118 generates a modulator pressure $P_M$ which is a constant pressure that has been set in advance. A signal pressure from a linear solenoid valve (not shown in the figure) is supplied to the first pressure adjusting valve 114 and the second pressure adjusting valve 116, and a predetermined signal pressure is outputted from this linear solenoid valve in response to a command from the electronic control unit 80, whereby the first pressure adjusting valve 114 and the second pressure adjusting valve 116 adjust the hydraulic pressure to a level advantageous for the vehicle traveling conditions on the basis of the accelerator depression amount and revolution speed of the engine 28.

As shown in FIG. 4, the lockup clutch 32 is a hydraulic friction clutch in which frictional engagement with a front cover 128 is caused by a difference pressure $\Delta P (=P_{ON}-P_{OFF})$ of a hydraulic pressure $P_{ON}$ inside an engagement hydraulic chamber 122 supplied via an engagement oil path 120 and a hydraulic pressure $P_{OFF}$ inside a disengagement hydraulic chamber 126 supplied via a disengagement oil path 124. The operation state of the torque converter 30 can be generally classified, for example, into three states: the so-called lockup OFF state in which the difference pressure $\Delta P$ is negative and the lockup clutch 32 is disengaged, the so-called slip state in which the difference pressure $\Delta P$ is equal to or higher than zero and the lockup clutch 32 is semi-engaged, and the so-called lockup ON state in which the difference pressure $\Delta P$ assumes a maximum value and the lockup clutch 32 is completely engaged. Further, in the slip state of the lockup clutch 32, by setting the difference pressure $\Delta P$ to zero, it is possible to eliminate torque distribution of the lockup clutch 32 and set the torque converter 30 to an operation state similar to the lockup OFF state.

The clutch switching valve 104 switches the lockup clutch 32 between engagement and disengagement, and a spool valve element 130 is provided inside the clutch switching valve 104 for switching the connection state. FIG. 4 shows a state in which the spool valve element 130 is in the OFF position (OFF) in which the section on the left side from the center line is in the disengaged state of the lockup clutch 32 and a state in which the spool valve element 130 is in the ON position (ON) in which the section on the right side from the center line is in the engaged state. The clutch switching valve 104 is provided with a disengagement port 132 communicating with the disengagement hydraulic chamber 126, an engagement port 134 communicating with the engagement hydraulic chamber 122, an input port 136 to which the second line pressure $P_{L2}$ is supplied, a discharge port 138 that discharges the working oil located inside the engagement hydraulic chamber 122 when the lockup clutch 32 is disengaged and also discharges the working oil that has flown out of the second pressure adjusting valve 116 when the lockup clutch 32 is engaged, a bypass port 140 that discharges the working oil located in the disengagement hydraulic chamber 126 when the lockup clutch 32 is engaged, a relief valve 142 into which the working oil is supplied that has flown out of the second pressure adjusting valve 116, a spring 144 that biases the spool valve element 130 towards the OFF position, and a hydraulic chamber 146 that receives a switching signal pressure $P_{SW}$ from the switching solenoid valve SL on the end surface of the spool valve element 130.

The lockup control valve 106 is provided with a spool valve element 148, a spring 150 that provides a thrust directing the spool valve element 148 to a slip (SLIP) position, a hydraulic chamber 152 that receives a hydraulic pressure $P_{ON}$ acting inside the engagement hydraulic chamber 122 of the torque converter 30 to bias the spool valve element 148 towards the slip position, a hydraulic chamber 154 that receives a hydraulic pressure $P_{OFF}$ acting inside the disengagement hydraulic chamber 126 of the torque converter 30 to bias the spool valve element 148 toward the complete engagement (ON) position, a hydraulic chamber 156 having supplied thereto a signal pressure $P_{SLU}$ outputted from the linear solenoid valve SLU for slip control, an input port 158 having supplied thereto a second line pressure $P_{L2}$ adjusted by the second pressure adjusting valve 116, and a control port 160 having supplied thereto a hydraulic pressure outputted from the bypass port 140 of the clutch switching valve 104. FIG. 4 shows a state in which the spool valve element 148 is positioned so that the section on the left side from a center line is in the slip (SLIP) position and shows a state in which the spool valve element 148 is positioned so that the section on the right side from a center line is in the complete engagement (ON) position.

The linear solenoid valve SLU for slip control serves to control the difference pressure $\Delta P$, that is, an engagement pressure (engagement hydraulic pressure) that actuates the engagement of the lockup clutch 32 when the lockup clutch 32 is engaged (slip-engaged). The linear solenoid valve SLU for slip control outputs the signal pressure $P_{SLU}$ in response to a command from the electronic control unit 80. Thus, it is an electromagnetic control valve that takes a constant modulator pressure $P_M$ adjusted by the third pressure adjusting valve 118 as a base pressure and reduces the modulator pressure $P_M$ to output the signal pressure $P_{SLU}$. This valve generates the signal pressure $P_{SLU}$ proportional to a drive current (excitation current) corresponding to a command supplied from the electronic control unit 80. Further, a drain port 162 of the linear solenoid valve SLU for slip control communicates with a check ball 164 and is therefore constantly closed by the check ball 164. Where a pressure equal to or higher than a predetermined pressure is applied to the check ball 164, the drain port is opened and the working oil is discharged.

The switching solenoid valve SL outputs a predetermined switching signal pressure $P_{SW}$ in response to a command from the electronic control unit 80. Thus, in the de-energized state (OFF state), the switching signal pressure $P_{SW}$ is taken as a drain pressure, and in the energized state (ON state), the switching signal pressure $P_{SW}$ is caused to act as a modulator pressure $P_M$ on the hydraulic chamber 146, whereby the spool valve element 130 of the clutch switching valve 104 is moved to an ON position (ON) which represents the engaged state.

With the hydraulic control circuit 100 configured in the above-described manner, the supply state of the working hydraulic pressure to the engagement hydraulic chamber 122 and the disengagement hydraulic chamber 126 is switched, and the operation state of the lockup clutch 32 is switched. First, the case in which the lockup clutch 32 is set to a slip state or lockup ON state will be explained. Where the switching signal pressure $P_{SW}$ is supplied to the hydraulic chamber 146 by the switching solenoid valve SL and the spool valve element 130 is biased to the ON position in the clutch switching valve 104, the second line pressure $P_{L2}$ supplied to the input port 136 is supplied from the engagement port 134 to the engagement hydraulic chamber 122 via the engagement oil path 120. The second line pressure $P_{L2}$ supplied to the engagement hydraulic chamber 122 becomes a hydraulic pressure $P_{ON}$. At the same time, the disengagement hydraulic chamber 126 communicates with the control port 160 of the lockup control valve 106 from the disengagement port 132 via the disengagement oil path 124 and through the bypass port 140. The hydraulic pressure $P_{OFF}$ inside the disengagement hydraulic chamber 126 is then adjusted by the lockup control valve 106 (that is, the difference pressure $\Delta P$, that is, the engagement hydraulic pressure, is adjusted by the lockup control valve 106), and the operation state of the lockup clutch 32 is switched within the range from the slip state to the lockup ON state.

More specifically, when the spool valve element 130 of the clutch switching valve 104 is biased to the engagement (ON) position, that is, when the lockup clutch 32 is switched to the engagement state, the signal pressure $P_{SLU}$ for biasing the spool valve element 148 to the compete engagement (ON) position in the lockup control valve 106 is not supplied to the hydraulic chamber 156, but where the spool valve element 148 is set to the slip (SLIP) position by the thrust of the spring 150, the second line pressure $P_{L2}$ supplied to the input port 158 is supplied from the control port 160 via the bypass port 140 and from the disengagement port 132 via the disengagement oil path 124 to the disengagement hydraulic chamber 126. The flow rate of the working oil outputted from the control port 160 is controlled by the signal pressure $P_{SLU}$ supplied to the hydraulic chamber 156. Thus, in a state in which the spool valve element 148 is set to the slip (SLIP) position, the difference pressure $\Delta P$ is controlled by the signal pressure $P_{SLU}$ of the linear solenoid valve SLU for slip control, and the slip state of the lockup clutch 32 is controlled.

Further, where the signal pressure $P_{SLU}$ for biasing the spool valve element 148 to the complete engagement (ON) position in the lockup control valve 106 is supplied to the hydraulic chamber 156 when the spool valve element 130 of the clutch switching valve 104 is biased to the ON position, the second line pressure $P_{L2}$ is not supplied from the input port 158 to the disengagement hydraulic chamber 126, and the working oil from the disengagement hydraulic chamber 126 is discharged from the drain port. As a result, the difference pressure $\Delta P$ assumes a maximum value and the lockup clutch 32 assumes a completely engaged state. In a slip state or a completely engaged state of the lockup clutch 32, the clutch switching valve 104 is set to the ON position. Therefore, the relief port 142 is caused to communicate with the discharge port 138. As a result, the working oil that has flown out of the second pressure adjusting valve 116 is supplied to the oil cooler 108 via the discharge port 138.

Meanwhile, where the switching signal pressure $P_{SW}$ is not supplied to the hydraulic chamber 146 and the spool valve element 130 is set to the OFF position by the biasing force of the spring 144 in the clutch switching valve 104, the second line pressure $P_{L2}$ supplied to the input port 136 is supplied from the disengagement port 132 to the disengagement hydraulic chamber 126 via the disengagement oil path 124. Further, the working oil that has been discharged via the engagement hydraulic chamber 122 to the engagement port 134 via the engagement oil path 120 is supplied from the discharge port 138 to the oil cooler 108 and cooled. Thus, in a state in which the spool valve element 130 of the clutch switch valve 104 is positioned in the OFF position, the lockup clutch 32 assumes the disengagement state, and no slip engagement control is performed via the linear solenoid valve SLU for slip control and lockup control valve 106. In other words, even when the signal pressure $P_{SLU}$ outputted from the linear solenoid valve SLU for slip control has been changed, as long as the spool valve element 130 of the clutch switch valve 104 is positioned in the OFF position, the change in the signal pressure is not reflected in the engagement state (difference pressure $\Delta P$) of the lockup clutch 32. Thus, the clutch switch valve 104 can block the supply of the engagement hydraulic pressure to the lockup clutch 32 regardless of the operation state of the linear solenoid valve SLU for slip control. In other words, it is possible to prevent the difference pressure $\Delta P$ serving as the engagement hydraulic pressure from assuming a positive value.

Figure 5:
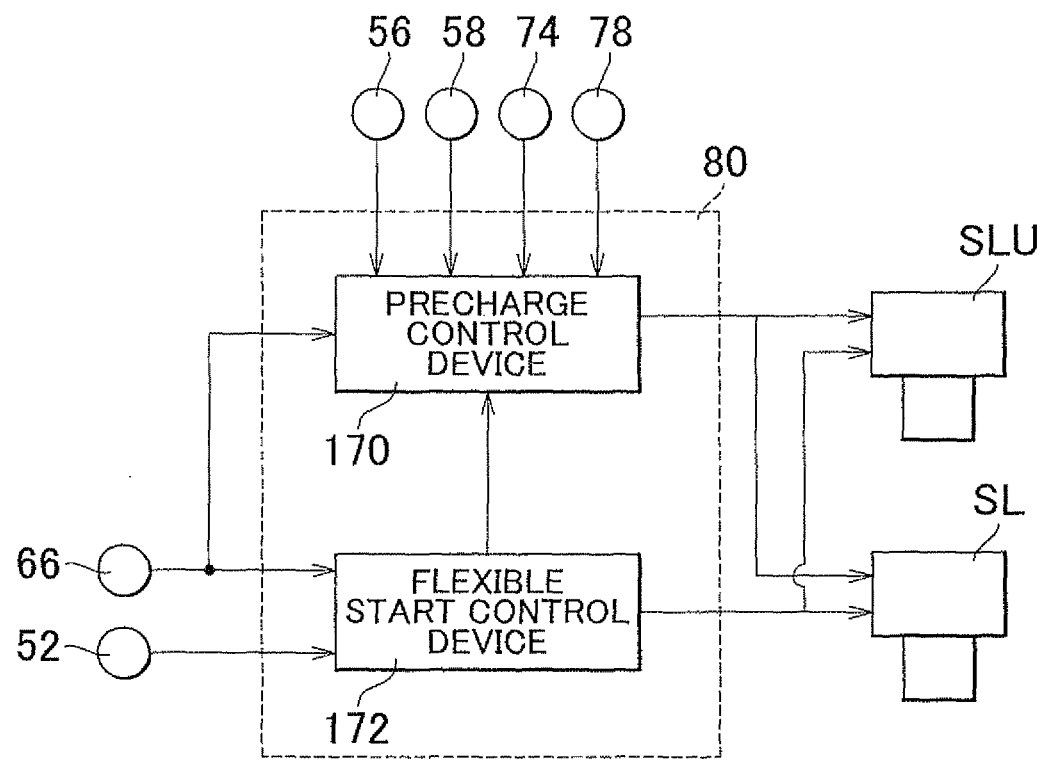
FIG. 5 is a functional block diagram illustrating main control functions provided in the electronic control unit shown in FIG. 3.

FIG. 5 is a functional block diagram illustrating the main features of control functions provided to the electronic control unit 80. As shown in FIG. 5, the electronic control unit 80 is provided with a precharge control unit, that is, a precharge control device 170, and a flexible start control unit, that is, a flexible start control device 172. The precharge control device 170 shown in FIG. 5 performs a precharge control for establishing a standby state in which a predetermined preparation pressure is indicated to the linear solenoid valve SLU for slip control, before the flexible start control by the below-described flexible start control device 172 is started. Thus, the precharge control device 170 determines whether the predetermined precharge control start conditions that has been set in advance have been fulfilled, and performs the precharge control when the precharge control start conditions have been fulfilled. More specifically, in the precharge control, a hydraulic control is performed by which a predetermined preparation pressure is indicated to the linear solenoid valve SLU for slip control, and the actual output pressure $P_{SLU}$ thereof is gradually increased. More specifically, as shown in the below-described FIG. 6, an output command that changes in a pulse-like mode is issued to the linear solenoid valve SLU for slip control, and a predetermined (constant) drive current corresponding to the predetermined preparation pressure is supplied to the linear solenoid valve SLU for slip control. When the below-described flexible start control start condition is fulfilled, the flexible start control is started and therefore the precharge control device 170 ends the precharge control. The preparation pressure as referred to hereinabove is an indication pressure that maintains a state in which the spool valve element 148 of the lockup control valve 106 is located in the slip position. Thus, the preparation pressure is empirically set as an indication pressure that is as high as possible, but generates only a thrust that is lower than the trust of the spring 150 holding the spool valve element 148 of the lockup control valve 106 in the slip position.

Further, when the precharge control is performed, the precharge control device 170 blocks the supply of the engagement hydraulic pressure to the lockup clutch 32 with the clutch switching valve 104. Thus, a state in which the spool valve element 130 of the clutch switching valve 104 is located in the OFF position is maintained and the difference pressure ΔP is prevented from assuming a positive value, while maintaining the OFF state of the switching signal pressure $P_{SW}$ from the switching solenoid valve SL.

The specific precharge control start conditions are as follows: (a) the brake switch 56 detects that a step-on operation of the foot brake pedal 54, which is the normal brake, that is, the vehicle brake operation that brakes the wheels is canceled (brakes are OFF), (b) the vehicle speed sensor 66 detects that the vehicle speed V is 0, that is, that the vehicle is stopped, and (c) the lever position sensor 74 detects that the operation position $P_{SH}$; of the shift lever 72 is a drive range (D range). In other words, the precharge control start conditions are fulfilled when all of the conditions (a) to (c) are fulfilled. From the standpoint of these precharge control start conditions, in order to cause the vehicle 8 to move, the operation position $P_{SH}$ is set to the D range as the vehicle is in a stopped state in which the wheels of the vehicle 8 are braked by the wheel brake device 42. Therefore, the precharge control device 170 starts the precharge control as the braking of the wheels is canceled when the vehicle starts moving.

A large number of other conditions may be added as the precharge control start conditions to the above-described conditions (a) to (c). For example, in addition to the fulfillment of the above-described conditions (a) to (c), the following conditions may be required to be fulfilled as the precharge control start conditions: (d) the AT oil temperature $T_{OIL}$ detected by the AT oil temperature sensor 78 is equal to or higher than a predetermined temperature, (e) the revolution speed $N_E$ of the engine 28 detected by the engine revolution speed sensor 58 is equal to or higher than a predetermined speed, (f) other control for example such as speed change control by the automatic transmission 10 is detected not to be performed, (g) no failure is determined to be caused by the hydraulic control circuit 100 or the like, and (h) an engagement prohibition requirement of the lockup clutch 32 is determined to be absent with respect to other control. Thus, the precharge control start conditions may be considered to be fulfilled when all of the conditions (a) to (h) are fulfilled.

The flexible start control device 172 performs the flexible start control of slip-engaging the lockup clutch 32 when the vehicle starts moving. Thus, when a predetermined flexible start control start condition that has been set in advance is fulfilled, the lockup clutch 32 is set to a slip engagement state and part of the output torque of the engine 28 is inputted to the automatic transmission 10 via the lockup clutch 32, whereby vehicle moving control is performed by which power for moving the vehicle is transmitted via the fluid in the torque converter 30 and the lockup clutch 32. The flexible start control start condition is fulfilled, for example, when an operation amount Acc of the accelerator pedal 50 detected by the accelerator operation amount sensor 52 is equal to or greater than a predetermined value (accelerator is ON) and the vehicle speed V detected by the vehicle speed sensor 66 is equal to or greater than a predetermined value, that is, when the wheels are detected to start rolling. When the flexible start control start condition is fulfilled, the flexible start control start device 172 determines to start the flexible start control.

More specifically, when the flexible start control is started, the flexible start control device 172 switches the clutch switching valve 104 to a state in which the engagement hydraulic pressure can be supplied to the lockup clutch 32. Thus, the spool valve element 130 of the clutch switching valve 104 is moved from the OFF position to the ON position by setting the switching solenoid valve SL from the non-energized state to the energized state. The difference pressure ΔP acting upon the lockup clutch 32 via the linear solenoid valve SLU for slip control can thus be adjusted. The flexible start control device 172 performs the flexible start control via the linear solenoid valve SLU for slip control. Thus, the output pressure $P_{SLU}$ from the linear solenoid valve SLU for slip control is feedforward controlled by controlling a command (drive current) supplied from the electronic control unit 80 to the linear solenoid valve SLU for slip control. With such a control, the difference pressure ΔP is controlled so that the actual slip revolution speed $N_S(=N_E-N_{IN})$ of the lockup clutch 32 becomes a preset target slip value $N_{SM}$. By performing such flexible start control, the increase in the revolution speed of the engine 28 when the vehicle starts moving is inhibited and good fuel consumption can be obtained when the vehicle starts moving. In the present embodiment, the fuel consumption is the traveling distance per unit amount of consumed fuel and the improvement of fuel consumption is the increase in the traveling distance per unit amount of consumed fuel or the decrease in the fuel consumption rate (=(amount of consumed fuel)/(drive wheel output)) of the entire vehicle. Conversely, the degradation of fuel consumption is the decrease in the traveling distance per unit amount of consumed fuel or the increase in the fuel consumption rate of the entire vehicle.

Further, it is preferred that the flexible start control device 172 indicate a predetermined surge pressure (surge output value) to the solenoid valve SLU for slip control immediately after the flexible start control has been started. The surge pressure is designed to supply a drive current of a predetermined value for a predetermined time interval to the solenoid valve SLU for slip control to accelerate the rise of the difference pressure ΔP $(=P_{ON}-P_{OFF})$ of the lockup clutch 32, thereby issuing an output command that changes in a pulse-like manner, such as shown by a broken line L01 in the below-described FIG. 6, to the solenoid valve SLU for slip control.

FIG. 6 is a time chart illustrating an example of precharge control performed by the precharge control device 170. The time chart representing conventional technology in FIG. 6 shows an indication value to the linear solenoid valve linear solenoid valve SLU for slip control in response to the indication value in the case in which the flexible start control is started without performing the precharge control, as in the conventional method. In FIG. 6, the indication value (indication pressure) to the linear solenoid valve SLU for slip control is represented by a dash-dot line, and the output pressure $P_{SLU}$, which is an actual pressure, is represented by a solid line. In order to compare the control of the present embodiment with the conventional control, the output pressure $P_{SLU}$ in the conventional control is shown by a thick broken line superimposed on the time chart of the control of the present embodiment.

In the example shown in FIG. 6, at a point in time t1, braking of the wheels is detected to be canceled by a signal from the brake switch 56. Therefore, in the control of the present embodiment, at the point in time t1, the precharge control start conditions, including other conditions, are fulfilled and the precharge control by the precharge control device 170 is started. Thus, the fast-fill is performed with respect to the linear solenoid valve SLU for slip control, while the switching signal pressure $P_{SW}$ from the switching solenoid valve SL is OFF, and then a predetermined drive current corresponding to the indication of the preparation pressure is applied and gradual increase in the output pressure $P_{SLU}$ is started. At this stage which precedes a point in time t2, the switching signal pressure $P_{SW}$ from the switching solenoid valve SL is OFF and the spool valve element 130 of the clutch switching valve 104 remains located in the OFF position. Therefore, the output pressure $P_{SLU}$ from the linear solenoid valve SLU for slip control produces no effect on the difference pressure ΔP of the lockup clutch 32 and the output pressure $P_{SLU}$ increases, but the engine revolution speed $N_E$ and the turbine revolution speed $N_T$ do not change. In the control of the present embodiment illustrated by FIG. 6, the output pressure $P_{SLU}$ matches the preparation pressure between the points in time t1 and t2.

By contrast, in the conventional control, the precharge control is not performed and therefore the output pressure $P_{SLU}$ from the linear solenoid valve SLU for slip control is not increased and is the same before and after the point in time t1.

Then, at the point in time t2, the accelerator depression amount Acc becomes equal to or greater than the predetermine value (accelerator ON) and the flexible start control start condition is fulfilled. Therefore, the precharge control is ended and at the same time the flexible start control by the flexible start control device 172 is started. Thus, the control of the difference pressure ΔP of the lockup clutch 32 by the output pressure $P_{SLU}$ of the linear solenoid valve SLU for slip control is started by switching ON the switching signal pressure $P_{SW}$ from the switching solenoid valve SL. This flexible start control is the same in the conventional control and the control of the present embodiment, but in the control of the present embodiment, the predetermined surge pressure (surge output value) may be indicated to the linear solenoid valve SLU for slip control, as shown by a broken line L01 in FIG. 6, or the surge output value may not be indicated.

Then, the flexible start control is performed by the flexible start control device 172 before the acceleration flexible control is started at a point in time t3, that is, within the interval from t2 to t3. For example, the flexible start control is ended and the acceleration flexible control is started when the vehicle speed V becomes equal to or higher than the control end vehicle speed that has been experimentally set in advance and at which the flexible start control is ended.

The precharge control has been performed at the points in time t1 to t2 in the control of the present embodiment (solid line) in order to compare the solid line with the thick broken line in the time chart of the lowermost stage in FIG. 6. As a result, the ability of the output pressure (actual pressure) $P_{SLU}$ to track the indication value (indication pressure) indicated to the linear solenoid valve SLU for slip control is improved when the flexible start control is started, that is, immediately after the point in time t2. Therefore, in the control of the present embodiment, the output pressure $P_{SLU}$ shifts higher at the start of the flexible start control than in the conventional control and, as shown in the time shaft of the engine revolution speed $N_E$, the unnecessarily rapid increase in the engine revolution speed $N_E$ as the vehicle starts moving can be inhibited more effectively. By so inhibiting the unnecessarily rapid increase in the engine revolution speed $N_E$, it is possible to attain a sufficient effect in improving fuel consumption.

FIG. 7 is a flowchart illustrating main features of control operations of the present embodiment performed by the electronic control unit 80, that is, control, operations performed by flexible start control after the precharge control has been performed. These operations are cyclically performed with a very short cycle time of, for example, from several milliseconds to several tens of milliseconds.

In FIG. 7, in step (the word "step" is hereinbelow omitted) S1 corresponding to the precharge control device 170, it is determined whether the precharge control start conditions have been fulfilled. For example, where the above-described conditions (a) to (c) are the precharge control start conditions, it is determined whether all of these conditions (a) to (c) have been fulfilled. Where a positive decision is made in S1, that is, where the precharge control start conditions have been fulfilled, the processing flow moves to S2. Where a negative decision is made in S1, the present flowchart ends.

In S2 corresponding to the precharge control device 170, the precharge control for establishing a standby state in which the predetermined preparation pressure is indicated to the linear solenoid valve SLU for slip control is performed. While the precharge control is being performed, the switching solenoid valve SL remains in a non-energized state. After S2, the processing flow moves to S3.

In S3 corresponding to the flexible start control device 172, it is determined whether the flexible start control start conditions are fulfilled. Thus, it is determined whether the operation amount Acc of the accelerator pedal 50 that is detected by the accelerator operation amount sensor 52 is equal to or higher than a predetermined value (accelerator ON) and whether the vehicle speed V detected by the vehicle speed sensor 66 is equal to or higher than a predetermined value, that is, whether the start of wheel rotation is detected. Where a positive decision is made in S3, that is, where the flexible start control start conditions have been fulfilled, the processing flow moves to S4. Where a negative decision is made in S3, the processing flow moves to S2 and the precharge control is continued.

In S4 corresponding to the flexible start control device 172, the switching solenoid valve SL is switched from the non-energized state to the energized state and the spool valve element 130 of the clutch switching valve 104 is moved from the OFF position to the ON position. Then, the flexible start control that slip-engages the lockup clutch 32 when the vehicle starts moving is performed. For example, this flexible start control is continued till the vehicle speed V reaches the control end vehicle speed, and when the vehicle speed V becomes equal to or higher than the control end vehicle speed, the control is switched to the acceleration flexible control.

Thus, in the present embodiment, the flexible start control device 172 performs the flexible start control of slip-engaging the lockup clutch 32 when the vehicle starts moving. Further, the precharge control device 170 performs the precharge control for establishing a standby state in which the predetermined preparation pressure is indicated to the linear solenoid valve SLU for slip control before the flexible start control is started. Therefore, immediately before the flexible start control is started, the output pressure $P_{SLU}$ outputted from the linear solenoid valve SLU for slip control rises to the preparation pressure or a hydraulic pressure close thereto and therefore a sufficient increase in response of the lockup clutch 32 in the flexible start control over that in the case without the precharge control can be ensured. Therefore, for example, as shown in the time chart in FIG. 6, the unnecessarily rapid increase in the revolution speed of the engine 28 caused by a delay of response in hydraulic pressure control of the linear solenoid valve SLU for slip control in the flexible start control can be adequately inhibited and fuel consumption can be improved. Further, since the unnecessarily rapid increase in the revolution speed of the engine 28 is inhibited when the vehicle starts moving, the drivability is improved.

Further, with the present embodiment, the precharge control device 170 blocks the supply of the engagement hydraulic pressure to the lockup clutch 32 with the clutch switching valve 104 while the precharge control is being performed. As a result, the disengaged state of the lockup clutch 32 can be reliably maintained while the precharge control is being performed and therefore the lockup clutch 32 can be prevented from being actuated to the engagement side before the vehicle starts moving and the unnecessary decrease in the engine revolution speed $N_E$ caused thereby can be avoided.

Further, with the present embodiment, the flexible start control device 172 switches the clutch switching valve 104 to the state in which the engagement hydraulic pressure can be supplied to the lockup clutch 32 when the flexible start control is started. Therefore, the engagement hydraulic pressure that has been set high in advance by the precharge control can be supplied to the lockup clutch 32 immediately after the flexible start control has been started. Therefore, before the flexible start control is started, the disengaged state of the lockup clutch 32 can be reliably maintained, and where the flexible start control is started, the lockup clutch 32 can be immediately actuated with good responsiveness to the engagement side.

Further, with the present embodiment, the precharge control is started when braking of the wheels is canceled. It can be predicted that where braking of the wheels is canceled when the vehicle starts moving, for example, the accelerator pedal 50 will be stepped on and the flexible start control will be started immediately thereafter. Therefore, the precharge control can be started in a suitable period before the flexible start control is started.

The preferred embodiments of the invention are described above in details with reference to the appended drawings, but the invention is not limited to these embodiments and other embodiments thereof are possible.

For example, in the present embodiment, an example is explained in which the invention is used to control the lockup clutch 32 in the torque converter 30 provided in an FF vehicle, but the invention can be also advantageously used in vehicles of other types, for example, front engine-rear drive (FR) vehicles.

Further, in the above-described embodiment, the accelerator depression amount Acc and vehicle speed V are determined as the flexible start control conditions, but it is also possible to determined only the accelerator depression amount Acc as the flexible start control condition, without determining the vehicle speed V.

Further, in the present embodiment, the automatic transmission 10 is a multiple-stage automatic transmission, but it may be also a continuously variable transmission (CVT).

Further, in the present embodiment, the automatic transmission 10 is not a mandatory component, and the vehicle 8 may include no automatic transmission 10. Essentially, it is suffice if the torque converter 30 constitute part of the power transmission path between the engine 28 and the drive wheels 40.

Further, in the present embodiment, the torque converter 30 acts to increase the transmitted torque as the slip between the input and output members thereof increases, but a hydraulic transmission device that demonstrates no such action increasing the transmitted torque may be also used.

Further, in the present embodiment, the wheels are braked by the wheel braking device 42 when the foot brake pedal 54 is stepped on, but for example the electronic control unit 80 may brake the wheels automatically with the wheel braking device 42, rather than with the foot brake pedal 54. When the wheels are thus braked automatically, braking of the wheels may be canceled by an operation other than the cancellation of the step-on operation of the foot brake pedal 54.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A control device for a vehicular lockup clutch, comprising:
   a lockup clutch that directly connects an input rotation member and an output rotation member of a hydraulic transmission device constituting part of a power transmission path between an engine and drive wheels;
   a linear solenoid valve that controls an engagement hydraulic pressure for engaging and actuating the lockup clutch; and
   a controller that is configured to perform a flexible start control at a time that acceleration is applied for slip-engaging the lockup clutch when a vehicle starts moving, and to perform, before starting the flexible start control, a precharge control for establishing a standby state in which a predetermined preparation pressure is indicated to the linear solenoid valve.

2. The control device for a vehicular lockup clutch according to claim 1, further comprising:
   a switching valve that blocks a supply of the engagement hydraulic pressure to the lockup clutch regardless of an operation state of the linear solenoid valve, wherein
   the controller blocks the supply of the engagement hydraulic pressure using the switching valve when the precharge control is being performed.

3. The control device for a vehicular lockup clutch according to claim 2, wherein
   the controller switches the switching valve to a state in which the engagement hydraulic pressure can be supplied when starting the flexible start control.

4. The control device for a vehicular lockup clutch according to claim 1, wherein
   the controller starts the precharge control when braking of wheels is canceled.

5. The control device for a vehicular lockup clutch according to claim 4, wherein
   the controller starts the precharge control when braking of the wheels is canceled, the vehicle is stopped, and a shift level is in a drive range.

6. The control device for a vehicular lockup clutch according to claim 1, wherein
   the controller starts the flexible start control when an operation amount of an accelerator pedal is equal to or greater than a predetermined value and a speed of the vehicle is equal to or greater than a predetermined value.

7. The control device for a vehicular lockup clutch according to claim 1, wherein a switching signal indicates a switch to the flexible start control.

* * * * *